United States Patent Office.

WILLIAM H. ROGERS, OF BROOKLYN, NEW YORK.

Letters Patent No. 103,931, dated June 7, 1870.

IMPROVED FUSE-COMPOSITION.

The Schedule referred to in these Letters Patent and making part of the same.

*To all whom it may concern:*

Be it known that I, WILLIAM H. ROGERS, of Brooklyn, in the county of Kings and State of New York, have invented a new and improved Fuse-Composition; and I do hereby declare that the following is a full, clear, and exact description thereof, which will enable others skilled in the art to make and use the same.

This invention relates to a new and useful improvement in a composition for fuses for blasting and other purposes, whereby fuses are made more useful and better adapted to the uses to which they are applied than they have hitherto been; and It consists in the ingredients hereinafter named, combined in about the proportions specified, viz:

Powdered charcoal, twenty parts.
Smalt or powdered glass, ten parts.
Chlorate of potash, ten parts.
Dissolved India rubber, thirty parts.

The above ingredients are thoroughly combined together, and then a sufficient quantity of bisulphide of carbon is added to give the composition a tough, waxy character, and suitable for being worked into the proper form for use.

The proportions may be varied to suit circumstances—that is, to make a slow or a fast-burning fuse.

The ordinary fuse not unfrequently becomes extinguished when placed in tubes or in chambers under ground, and excluded from the air, in the springing of mines, and in blasting under certain circumstances.

A fuse formed of the ingredients named is absolutely unextinguishable by exposure to wind or strong currents of air, or by partial exclusion from air when confined in tubes or channels under or above the ground.

Having thus described my invention,

I claim as new and desire to secure by Letters Patent—

The above composition, substantially as and for the purposes described.

The above specification of my invention signed by me this 28th day of March, 1870.

WILLIAM H. ROGERS.

Witnesses:
GEO. W. MABEE,
ALEX. F. ROBERTS.